United States Patent
Rado et al.

(10) Patent No.: US 10,203,518 B2
(45) Date of Patent: Feb. 12, 2019

(54) PINCE-NEZ

(71) Applicant: BINOPTICS, Uccle (BE)

(72) Inventors: Emmanuel Rado, Grenoble (FR); Pierre Alex, Grenoble (FR)

(73) Assignee: BINOPTICS, Uccle (BE)

( * ) Notice: Subject to any disclaimer, the term of this patent is extended or adjusted under 35 U.S.C. 154(b) by 0 days.

(21) Appl. No.: 15/127,917

(22) PCT Filed: Mar. 20, 2015

(86) PCT No.: PCT/EP2015/055995
§ 371 (c)(1),
(2) Date: Feb. 15, 2017

(87) PCT Pub. No.: WO2015/140324
PCT Pub. Date: Sep. 24, 2015

(65) Prior Publication Data
US 2017/0192248 A1    Jul. 6, 2017

(30) Foreign Application Priority Data
Mar. 21, 2014   (EP) ..................... 14161199

(51) Int. Cl.
*G02C 5/12* (2006.01)
*G02C 5/00* (2006.01)
(Continued)

(52) U.S. Cl.
CPC .............. *G02C 5/128* (2013.01); *A45C 11/04* (2013.01); *A45C 11/06* (2013.01); *G02C 3/003* (2013.01);
(Continued)

(58) Field of Classification Search
CPC . G02C 5/12; G02C 5/00; G02C 11/00; G02C 5/128; G02C 5/08; G02C 5/006; G02C 5/06; G02C 3/003; G02C 5/126
(Continued)

(56) References Cited

U.S. PATENT DOCUMENTS 1,150,114 A * 8/1915 Hays ..................... F16B 39/24
                                                         16/228
D155,480 S * 10/1949 Castelli ....................... D3/265
(Continued)

FOREIGN PATENT DOCUMENTS

| FR | 2472764 A1 | 7/1981 |
| WO | 2012069980 A2 | 5/2012 |
| WO | 2015140324 A1 | 9/2015 |

OTHER PUBLICATIONS

International Search Report for PCT/EP2015/055995 dated Apr. 27, 2015.

*Primary Examiner* — William R Alexander
*Assistant Examiner* — Henry Duong
(74) *Attorney, Agent, or Firm* — Bachman & LaPointe, P.C.

(57) ABSTRACT

An assembly comprises a pince-nez molded in one piece and comprises a substantially planar structure which has a first rim provided with a first lens and a second rim provided with a second lens, the structure having a plane which passes through the first and second rims and the first and second lenses, the first and second rims each being extended by a linkage which connects them together; a holding element intended to be secured to the pince-nez is in contact with the linkage and comprises at least two portions, the holding element secured to the linkage being elastically deformable between a storage position whereby the portions are separated from each other, and a tensioned position whereby the
(Continued)

portions are constrained closer together; and a case intended to contain the pince-nez for the storage of the pince-nez.

15 Claims, 6 Drawing Sheets

(51) Int. Cl.
*G02C 3/00* (2006.01)
*G02C 5/06* (2006.01)
*G02C 5/08* (2006.01)
*A45C 11/04* (2006.01)
*A45C 11/06* (2006.01)

(52) U.S. Cl.
CPC ............... *G02C 5/006* (2013.01); *G02C 5/06* (2013.01); *G02C 5/08* (2013.01); *G02C 5/126* (2013.01)

(58) Field of Classification Search
USPC .......................................................... 351/78
See application file for complete search history.

(56) References Cited

U.S. PATENT DOCUMENTS

| | | | | |
|---|---|---|---|---|
| 4,000,810 A | * | 1/1977 | Leblanc | ................. A45C 11/04 206/5 |
| 2004/0256249 A1 | * | 12/2004 | Sarif | ...................... A45C 11/04 206/5 |
| 2012/0154737 A1 | | 6/2012 | Daole | |

* cited by examiner

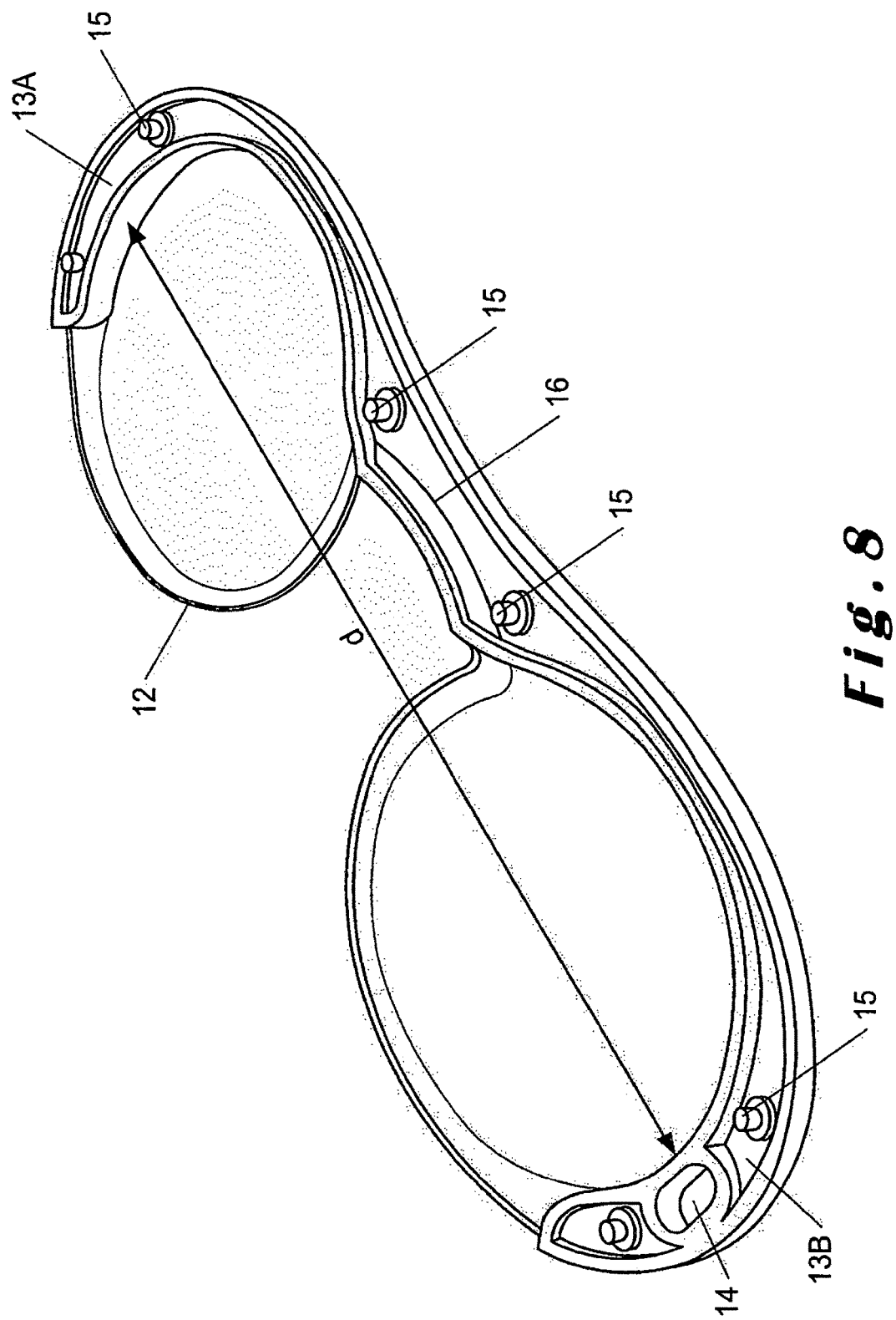

PINCE-NEZ

BACKGROUND

This invention relates to a pince-nez moulded in one piece, comprising a substantially planar structure which has a first rim provided with a first lens and a second rim provided with a second lens, said structure having a plane which passes through said first and second rims and said first and second lenses, said first and second rims each being extended by a linkage which connects them together, said linkage being designed to be in contact with a holding element intended to be placed on the nose of a user.

Such a pince-nez is known in the prior art. It does not have temples and is intended to be placed on the nose of a user. In this manner, the pince-nez is supported solely by the nose.

Such a pince-nez is known for its impracticality of use, as it is not maintained in a stable manner on the nose of the user. Moreover, when the user moves around with the pince-nez on his/her nose, the pince-nez can easily tilt or be displaced when the user is in motion. Consequently, such a pince-nez is not practical for use, as the user is required to limit his/her movements as much as possible while using it, which significantly limits the use made of such a pince-nez.

In order to try to improve securing the pince-nez on the nose of the user, one proposal provides for a pince-nez having a "nose clamp", which is in fact uncomfortable for the user, who must tolerate relatively strong pinching. The quality of comfort of such a pince-nez is significantly reduced.

Other pince-nez have been developed in order to overcome the aforementioned problems. The use of a pince-nez has quickly evolved towards the addition of a temple on one side of the structure so as to enable the user to hold the temple of the pince-nez and thus hold the pince-nez on his/her nose.

Unfortunately, the ease of handling of such a pince-nez is limited as, with such a configuration, the user is required to hold the pince-nez when using it to read. It is clear that such a pince-nez is neither comfortable nor practical for use.

A new generation of pince-nez also exists, to which a holding element has been added. Such a pince-nez is disclosed in document KR 2012 000 2025, which describes that the holding element is intended to be placed on the nose of a user. When the pince-nez is placed on the nose of the user, the former has a back side facing the user and a front side facing the surrounding environment. The holding element disclosed is secured to the back side at the level of the linkage of said first and second rims. The holding element comprises two circular elements that are not included in the plane of the structure of the pince-nez. The two circular elements have a first position referred to as a "parallel" position and a second position referred to as an "opening" position. In the first position, the two circular elements are parallel to each other and in the second position, the two circular elements are spaced apart from each other, thus creating an empty space.

The user looking to secure the pince-nez on his/her nose must separate the two circular elements from each other in the second position in order for the nose to have access to the space thus created. Then, the passage from the second position to the first position allows for the pince-nez to be secured, by means of the holding element, onto the nose.

It emerges from the aforementioned document that the pince-nez with the holding element is not comfortable when placed on the nose of the user, due to the presence of the two circular elements that protrude outwards from the pince-nez. Indeed, the user must constantly separate then bring together the two circular elements in the hope that the pince-nez will consequently remain on his/her nose. Once the pince-nez is placed on the nose, it is not out of the question that the two circular elements move away from each other again and no longer sufficiently pinch the nose of the user. The securing and stability of such a pince-nez on the nose of a user cannot therefore be guaranteed. The stability of the pince-nez is not therefore guaranteed at times when the user leans forward or is in motion.

However, as described hereinabove, it is preferable to provide a pince-nez that is comfortable and stable in order for the pince-nez to remain on the nose of the user, even when the latter is in motion. The wearing of such a pince-nez is therefore not practical and reliable.

Moreover, the back-and-forth movement of the two circular elements during use results in long-term wear of the two circular elements of the holding element disclosed in the document KR 2012 000 2025. The reliability of such a pince-nez cannot therefore be guaranteed over a long period of time.

In light of the above, the use of such a pince-nez initially appears difficult given the high number of limitations of the pince-nez known in the prior art and for which the aforementioned problems have not yet been overcome.

To date, and in light of the above, it is clear that there is a real need to provide a pince-nez, the reliability of which can be guaranteed over a longer period of time compared to known pince-nez, that is easy to handle, without being detrimental to the stability of the pince-nez on the nose of a user, even when the latter is in motion. This would make the wearing of a pince-nez both pleasant and practical.

SUMMARY

The purpose of the invention is to overcome the drawbacks of the prior art by providing a pince-nez that is easy to handle, comfortable to use, reliable compared to pince-nez from the prior art, and whose securing on the nose of a user can be guaranteed during use, even when the user is in motion.

The invention relates to an assembly comprising:
  a pince-nez moulded in one piece and comprising a substantially planar structure which has a first rim provided with a first lens and a second rim provided with a second lens, said structure having a plane which passes through said first and second rims and said first and second lenses, said first and second rims each being extended by a linkage which connects them together;
  a holding element intended to be secured to the pince-nez in contact with the linkage and comprising at least two portions, said holding element secured to the linkage being elastically deformable between a storage position whereby the portions are separated from each other, and a tensioned position whereby the portions are constrained closer together;
  and
  a case intended to contain said pince-nez for the storage of said pince-nez;
the assembly being characterised in that the case comprises a location intended to store the holding element while secured to the linkage, the pince-nez and the location being designed so that, upon storing of the holding element into said location, said holding element is reversibly deformed from its first to its second position for securing the holding element in its first position into the location and thus the pince-nez in the case.

In particular, the deformation of the holding element into its second position is achieved upon constrained rapprochement of lateral portions by bearing of said portions on walls of the location.

To do so, the walls of the location and the lateral portions can comprise complementary concavities arranged to secure in the location the holding element in its first position.

The pince-nez and the case can be arranged so that the storage of the pince-nez in the case is achieved upon relative translation between said pince-nez and said case, the reversibly deformation of the holding element being achieved by constrained rapprochement of lateral portions of said holding element.

The case can comprise a first housing with a shape complementary to the shape of the first rim provided with the first lens, a second housing with a shape complementary to the shape of the second rim provided with the second lens, and a bridge connecting the first and second housings to each other, the location for the holding element being delimited between the first and second housings and the bridge.

Preferably, the pince-nez has a first ready-to-wear position, wherein the pince-nez is arranged to be placed on the nose of a user, and a second position wherein the holding element is deformed into its storage position.

Preferably, the case has a first rim and a second rim and a linking element connecting said first and second rims to each other, said first and second rims being spaced apart from each other by a distance d corresponding to the length of the case and being arranged so as to maintain said pince-nez in the second position, when said pince-nez is stored in said case.

This has the advantage of allowing for the pince-nez to be stored when the former is in the second position, i.e. when the two portions of the holding element are moved closer to each other. Therefore, once stored in the case, the holding element is slightly tensioned, which enables the pince-nez to be held sufficiently well in the case.

Advantageously, the length of the case is less than or equal to that of the pince-nez in the first position such that, when the pince-nez in the first position takes on the second position, it can be inserted into said case and thus be sufficiently held in place.

The linkage can be curved and can have a first and a second point of inflection.

Therefore, the presence of the first and second points of inflection at the level of the linkage provides for a pince-nez with a particularly flexible, curved linkage, given that at each point of inflection, a change in concavity takes place. The flexibility of the linkage enables the nasal separation located between the first and second lenses to be adjusted, which has the advantage of allowing the pince-nez to adapt to suit all nose types.

The first and second lenses can therefore be moved closer to each other, thus moving the two points of inflection closer together in order to substantially reduce the nasal separation.

Moreover, it has been observed that the linkage having a first and a second point of inflection further allows the first and second lenses to be spaced apart from each other in order to again adapt the separation between the first and second lenses.

Moreover, such a pince-nez further has the advantage of being more robust, as the flexibility of the linkage allows it to take on a plurality of orientations, thus reducing the risk of breakage.

The pince-nez is therefore easy to handle as the first and second lenses can be easily moved away from and towards each other without the risk of breaking the pince-nez.

Moreover, the pince-nez is arranged such that it is in contact with a holding element, which is intended to be placed on the nose of the user.

The presence of the first and second points of inflection allow the holding element to grip the structure of the pince-nez in a reversible manner. Therefore, once secured to said pince-nez, the holding element is fully incorporated into the structure of the latter.

The integration of the holding element having a predefined planar geometry within the structure of the pince-nez allows the former to lie within the plane of the structure of the pince-nez. Given that the plane of the structure also passes through said first and second rims and said first and second lenses, the addition of the holding element on the pince-nez allows for the predefined planar geometry of the holding element to be truly merged with the structure of the pince-nez. The planar geometry of the pince-nez is therefore defined in the plane of the structure of the pince-nez.

When the pince-nez comprises the holding element, the latter does not affect or only affects to a very small degree the position of the centre of gravity of the pince-nez. This has the benefit, when positioning the pince-nez comprising the holding element, of having no counterweight likely to reduce the securing efficiency of the pince-nez placed on the nose of the user.

Therefore, the pince-nez offers the user comfort of use, reliability and easy handling.

Advantageously, the pince-nez has a first ready-to-wear position wherein the pince-nez is arranged to be placed on the nose of a user and wherein the linkage is in the resting position, whereby the first and second points of inflection are separated from each other and a second position wherein said first rim at least partially covers said second rim and wherein the linkage is in the tensioned position, whereby the first and second points of inflection are close together.

This allows for the reduction in size of the pince-nez and to store it in a pocket when in the second position. Moreover, the nasal separation can also be adapted as desired by orienting the pince-nez from the first position to the second position.

In particular, said linkage has a first linkage portion on one side of the first point of inflection, and a second linkage portion on the other side of the first point of inflection, and said second linkage portion on one side of the second point of inflection, and a third linkage portion on the other side of the second point of inflection, said first and third portions of said linkage having an upwards concavity, when the pince-nez is in the ready-to-wear position.

The linkage can have three successive curved portions whereby the first and third portions have an upwards concavity, which further increases the flexibility of the linkage of the pince-nez.

The advantage thereof is that the user can adjust the nasal separation by placing his/her fingers on the first and third curved portions which have an upwards concavity, thus defining a hollow portion for the fingers of the user.

In a particularly advantageous manner, the first portion of the linkage is connected to the first rim of the pince-nez via one of its ends and the third portion of the linkage is connected to the second rim of the pince-nez via one of its ends.

In particular, said first rim provided with the first lens partially surrounds said first lens and said second rim provided with the second lens partially surrounds said second lens, said first and second rims having a thickness that is at least greater than that of said first and second lenses.

This feature has the advantage of leaving a portion of the first and second lenses free in order to potentially add other structural elements to the pince-nez.

In particular, the first and third portions of said linkage each have a radius of curvature ranging from 2 to 6 mm, preferably from 3 to 5 mm, and more preferably equal to 3 mm.

Moreover, a linkage with at least one downwards concave portion is particularly favourable for the flexibility of the linkage of the pince-nez, which is preferred within the scope of this invention.

Preferably, said second portion of said linkage has a downwards concavity which allows it to provide a contact surface for a holding element.

Moreover, in one specific embodiment, said second portion of said linkage has a radius of curvature ranging from 1 to 3 cm, preferably from 1.5 to 2.5 cm, and more preferably from 1.5 to 2 cm, which allows for the adjustment of the curvature of the first and third portions of the linkage.

Preferably, said first and second lenses or the first and second rims are each provided with connection means arranged to engage said holding element to said pince-nez, which allows a holding element to be secured to the structure of the pince-nez.

Preferably, said connection means are chosen from the group comprising fins, protrusions, preferably rigid protrusions, such as protrusions having the shape of buttons or mushrooms and combinations thereof.

Preferably, the structure of the pince-nez, the first lens and the second lens are made from a same material.

Even more preferably, the pince-nez is made from a material chosen from the group comprising elastomers, preferably polycarbonate, polyurethane, glass or combinations thereof.

Preferably, said linkage has a width of between 1 and 8 mm and a thickness of between 0.05 and 1.5 mm.

In particular, the holding element has a curved shape and comprises a first and second point of inflection.

Advantageously, the holding element has a first portion on one side of the first point of inflection, and a second portion on the other side of the first point of inflection, and said second portion on one side of the second point of inflection, and a third portion on the other side of the second point of inflection, said first and third portions having an upwards concavity and said second portion having a downwards concavity.

Therefore, the shape of the holding element is adapted to suit the shape of the linkage of the pince-nez such that its fastening to the pince-nez is made easy.

Preferably, the holding element comprises five curved portions whereby the first, second and third portions are arranged so that they are in contact with respectively first, second and third portions of the linkage of the pince-nez and whereby the fourth and fifth portions are arranged such that they are secured to said pince-nez by means of connection means.

The advantage of this is that several portions of the holding element can be secured to the pince-nez.

Preferably, the holding element is made from a material chosen from the group comprising elastomers, preferably polycarbonate, polyurethane, silicone, more preferably thermoplastic elastomers or combinations thereof.

Other features, details and advantages of the invention will be better understood upon reading the following description, which is not intended to limit the scope of the invention, with reference to the appended figures.

BRIEF DESCRIPTION OF THE DRAWINGS

FIG. 8 shows a portion of the case according to the invention.

DETAILED DESCRIPTION

In the figures, identical or similar elements keep the same reference numbers.

Within the scope of this invention, the expression "portion having an upwards concavity" must be understood as meaning that the portion concerned has a bottom oriented downwards and an opening oriented upwards.

Within the scope of this invention, the expression "portion having a downwards concavity" must be understood as meaning that the portion concerned has a bottom oriented upwards and an opening oriented downwards.

Within the scope of this invention, the term "nasal separation" must be understood as the distance located between the first lens and the second lens, at the same height as the linkage.

Figure 1:
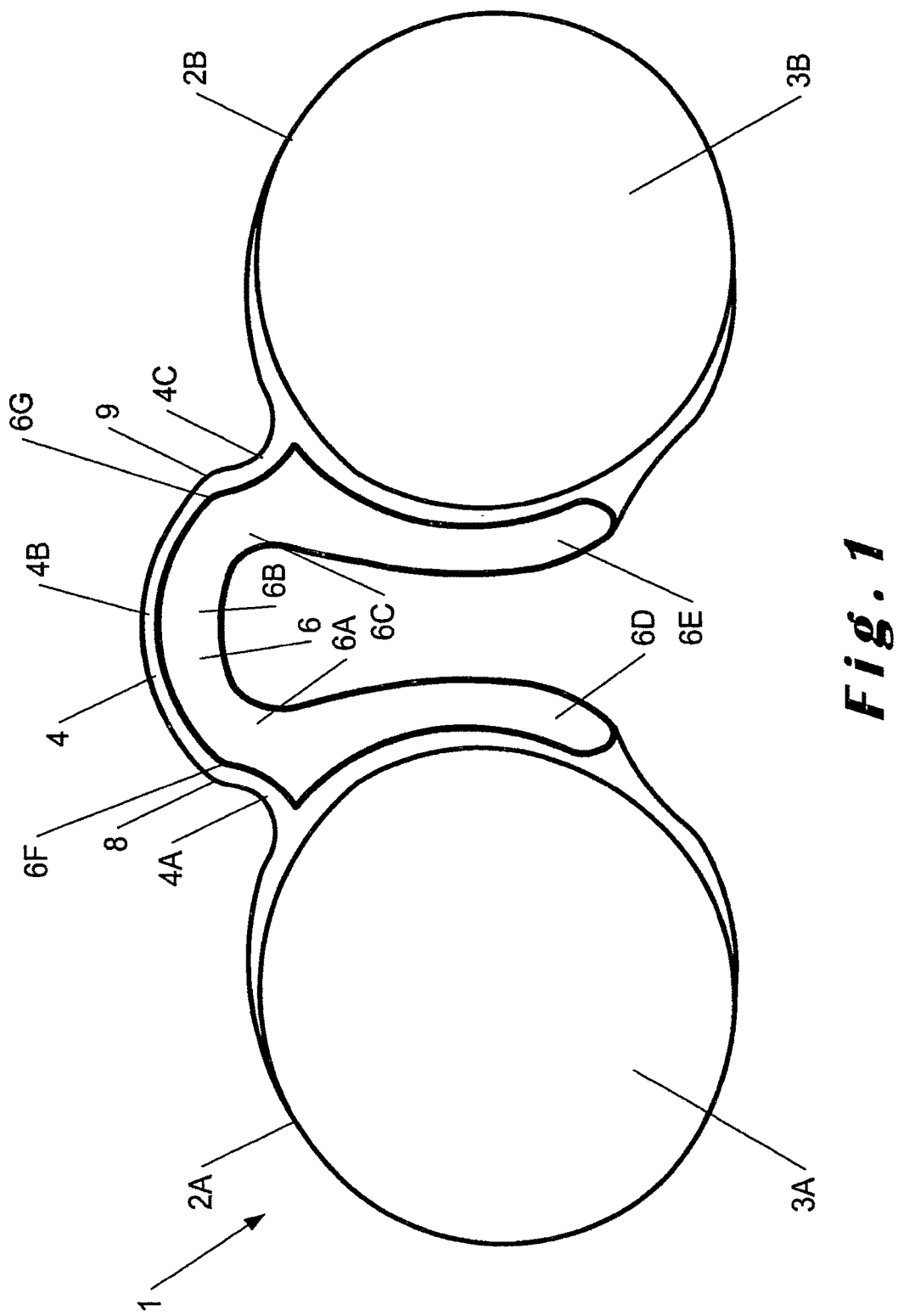
FIG. 1 is a plan view of a pince-nez comprising a holding element according to this invention.

The structure of the pince-nez 1, illustrated in FIG. 1, comprises a first rim 2A and a second rim 2B, which are extended by a linkage 4 connecting them to each other. The linkage 4 is in contact with a holding element 6, which is intended to be placed on the nose of a user.

The first and second rims 2A, 2B of the pince-nez 1 are logically provided with lenses 3A, 3B. The first rim 2A partially surrounds said first lens 3A and the second rim 2B partially surrounds said second lens 3B.

The portions of the first and second rims 2A, 2B that are in contact with the holding element 6 have a thickness at least greater than that of said first and second lenses 3A, 3B.

As shown in FIG. 1, the linkage 4 of the pince-nez 1 is curved and has two points of inflection 8, 9, which provide the pince-nez 1 with an advantageous flexibility. This enables the pince-nez 1 according to the invention to take on a plurality of orientations.

More specifically, the linkage 4 has a first linkage portion 4A on one side of the first point of inflection 8, said first linkage portion being connected to the first rim 2A, and a second linkage portion 4B is located on the other side of the first point of inflection 8, said second linkage portion extending said first portion 4A of the linkage 4 of the pince-nez 1.

Moreover, the linkage 4 further comprises the aforementioned second linkage portion 4B on one side of the second point of inflection 9, and a third linkage portion 4C on the other side of the second point of inflection 9, said third linkage portion being connected to the second rim 4C.

Said first and third portions 4A, 4C of said linkage 4 have an upwards concavity, when the pince-nez 1 is in the ready-to-wear position, which corresponds to a position in which the two points of inflection are spaced apart from each other, as illustrated in FIG. 1.

Said second portion 4B of said linkage 4 has a downwards concavity.

Therefore, the passage between the first portion 4A of the linkage 4 to the second portion 4B of the linkage 4 defines a first point of inflection 8 where the change in concavity occurs and the passage from the second portion 4B of the linkage 4 to the third linkage portion 4C defines the second point of inflection 9.

According to the embodiment illustrated in FIG. 1, the pince-nez is in a first position, referred to as a "ready-to-wear position", which corresponds to a resting position of the linkage 4 in which the first and second points of inflection 8, 9 are spaced apart from each other. In this position, the user can simply place the pince-nez on his/her nose.

Advantageously, the flexibility of the pince-nez 1 according to the invention allows the user to further move, where desired, the first and second points of inflection 8, 9 away from each other. In this manner, the first and second rims 2A, 2B can be spaced apart from each other in order to ease positioning on the nose.

As shown in FIG. 1, the first and third portions 4A, 4C of the linkage 4 can allow the user to place his/her fingers in the hollow thus formed in order to easily hold the pince-nez 1.

More advantageously, the first and third portions 4A, 4C of said linkage 4 have a radius of curvature ranging from 2 to 6 mm, preferably from 3 to 5 mm, and more preferably equal to 3 mm.

Preferably, said second portion 4B of said linkage 4 has a radius of curvature ranging from 1 to 3 cm, preferably from 1.5 to 2.5 cm, and more preferably from 1.5 to 2 cm.

The structure of the pince-nez 1 can be made from a flexible or rigid material. Preferably, the structure can be made from elastomers, for example polycarbonate or polyurethane. The structure of the pince-nez 1 can also be made from glass or any other material allowing for the creation of a structure of a pince-nez 1.

The structure of the pince-nez 1 can be made using any method known for the manufacture of such a structure, for example via a one-shot injection technique, allowing for directly obtaining the structure of the pince-nez 1, or via an injection technique allowing for the manufacture of the structure of the pince-nez 1 without the lenses 3A, 3B, whereby the latter can be added at a later point in time. Therefore, the structure of the pince-nez 1, the first lens 3A and the second lens 3B can be made from the same material, or a plurality of materials can be combined with each other to produce the structure of the pince-nez 1.

The structure of the pince-nez is thus cast in one piece, which significantly eases its manufacturing method.

One advantageous embodiment consists in manufacturing a polycarbonate structure onto which glass lenses are secured. A pince-nez can also be produced, comprising a holding element that is made entirely from silicone.

The holding element 6, illustrated in FIG. 1, has a predefined planar geometry such that it can be secured to the structure of the pince-nez 1 according to the invention so as to provide a pince-nez 1 that is stable, reliable and comfortable during use.

In this preferred embodiment, the holding element is secured at the level of the linkage 4 and the first and second rims 2A, 2B of the pince-nez 1.

As shown in FIG. 1, the holding element 6 has a curved shape and comprises a first and second point of inflection 6F, 6G. To each point of inflection 6f, 6G corresponds a change in concavity, which therefore has the same advantage as the pince-nez, in this instance advantageous flexibility enabling it to withstand a possible deformation.

The holding element 6 according to this embodiment comprises 5 successive curved portions: a first portion 6A, a second portion 6B, a third portion 6C, a fourth portion 6D and a fifth portion 6E.

The first portion 6A and the third portion 6C of the holding element have an upwards concavity and the second portion 6B of the holding element 6 has a downwards concavity.

The first, second and third portions 6A, 6B, 6C respectively engage with the first, second and third portions 4A, 4B, 4C of the linkage 4 of the pince-nez 1 which they can grip.

The fourth and fifth portions 6D, 6E of the holding element 6 are respectively secured to the first and second rims 2A, 2B of the pince-nez 1.

The holding element 6 is made from a material chosen from the group comprising elastomers, preferably polycarbonate, polyurethane, silicone, more preferably thermoplastic elastomers or combinations thereof.

The holding element 6 can therefore be made from the same material as the structure of the pince-nez 1. However, the holding element 6 is advantageously manufactured from a material that is more flexible than the structure of the pince-nez 1 in order to improve comfort when wearing the pince-nez 1 worn by means of the holding element 6, which is designed to be placed on the nose of the user.

According to this invention, a holding element 6 made in one piece is advantageously provided so as to ease its implementation, its integration into the structure of the pince-nez 1 and its replacement.

Preferably, the holding element 6 can be secured at the level of the linkage 4, on the first and second lenses 3A, 3B, or on the linkage 4 and the first and second lenses 3A, 3B.

Advantageously, the linkage 4 according to the invention has a width of between 1 and 8 mm and a thickness of between 0.05 and 1.5 mm.

Figure 2:
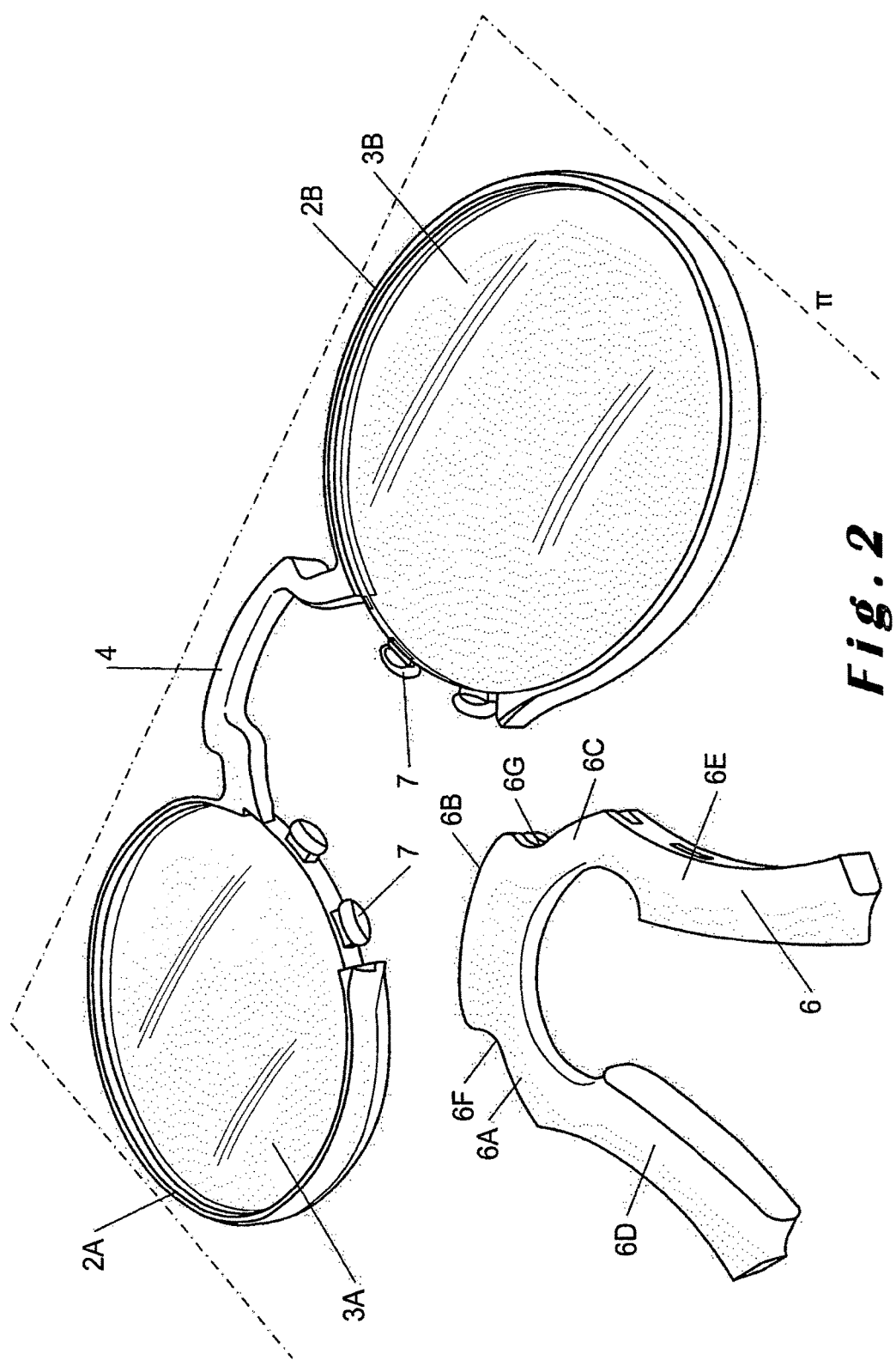
FIG. 2 is a perspective view of a pince-nez and a holding element according to the invention.

FIG. 2 is a perspective view of a pince-nez 1 according to this invention and of a holding element 6 according to the invention.

The structure of the pince-nez comprises all elements presented for the pince-nez illustrated in FIG. 1, except that the connection means 7 are present on the first and second lenses 3A, 3B, and that the first and second rims 2A, 2B consequently surround the first and second lenses 3A, 3B in a different manner.

Said first rim 2A of the pince-nez 1 provided with the first lens 3A partially surrounds the latter and said second rim 2B of the pince-nez 1 provided with the second lens 3B partially surrounds said second lens 3B. In this manner, a portion of the edge of the first lens 3A faces a portion of the edge of the second lens 3B, at the same height as the linkage 4 of the pince-nez.

This allows an empty space to be left for two connection means 7 positioned on the first and second lenses 3A, 3B.

Moreover, said first and second rims 2A, 2B have a thickness at least greater than that of said first and second lenses 3A, 3B.

The connection means 7 are present in the form of buttons, having a rounded head and a bottom connecting the head to the corresponding lens.

The holding element 6 has the same structure as that described for the holding element illustrated in FIG. 1.

In this embodiment, the holding element 6 can be seen to have a plurality of orifices designed to be engaged at the level of the buttons.

When the holding element 6 is positioned on the linkage 4 of the pince-nez 1, the orifices are positioned facing the buttons, which thus enter the orifices by forcing the passage of the head such that the bottoms become housed in the orifices and that the heads with the largest cross-sections position the holding element 6 with respect to the pince-nez 1. In this manner, the shape of the buttons allows the holding element 6 to be moved slightly backwards and forwards, in relation to the pince-nez 1, which further improves the positioning of the pince-nez on the nose of a user.

FIG. 2 shows that a plane n crosses the structure of the pince-nez 1 as well as the first and second rims 2A, 2B and the first and second lenses 3A, 3B. This figure illustrates the fact that the holding element 6 falls within the plane n of the structure of the pince-nez 1 such that the former is ideally integrated into the structure of the pince-nez 1. This provides a pince-nez 1 that comprises a holding element 6, the weight of which is symmetrically distributed in its structure. Therefore, the position of the centre of gravity of the pince-nez 1 is not affected by the presence of the holding element 6.

The illustration in FIG. 2 highlights one manner in which the product can occur once marketed for sale. The components of the pince-nez 1, in this instance the structure of the pince-nez 1 and the holding element 6, can be provided separately. In this manner, the user can therefore simply fasten the holding element 6 at the level of the linkage 4, where it can grip the structure of the pince-nez 6 in order to form a pince-nez 1 ready for use.

It is understood that the connection means can take on any shape, for example that chosen from the group comprising fins, protrusions, such as mushroom-shaped protrusions or combinations thereof.

Advantageously, the connection means 7 can take on the form of buttons, preferably two in number, having a rounded head and a bottom with a cross-section that is smaller than that of the rounded head.

If the connection means 7 are formed from fins and buttons, the backwards movement of the holding element 7 is restricted even further in relation to the pince-nez 1. Moreover, the presence of fins is used to guide the holding element 6 when secured to the structure of the pince-nez 1 and the buttons hold it in position.

The pince-nez 1 thus developed is easy to handle, stable on the nose of the user, reliable and comfortable during use.

It is understood that the holding element (6) can be secured to the structure of the pince-nez 1 in a reversible manner, which allows it to be easily replaced. This replacement is easy and quick to perform as the user simply has to dislodge the holding element 6 from the connection means 7. Therefore, when the user is looking to change the style of the pince-nez, he/she can simply replace the holding element 6 with another.

The holding element 6 can take on a plurality of colours (blue, pink, yellow, green, red, black, etc.) so that the user can choose the colour of the holding element 6. Therefore, the pince-nez 1 can have at least two colour ranges, preferably a series of colours.

Preferably, the holding element 6 can be provided in different sizes, for example in three different sizes, in order to allow the user to choose the holding element 6 that suits the nose size of the user.

It should be noted that within the scope of this invention, the structures of the pince-nez 1 and of the holding element 6 according to the invention advantageously allow for the pince-nez to be adapted to suit all types of nose, thanks to the flexibility and ease of handling of the pince-nez, which can take on a plurality of orientations.

Figure 3:
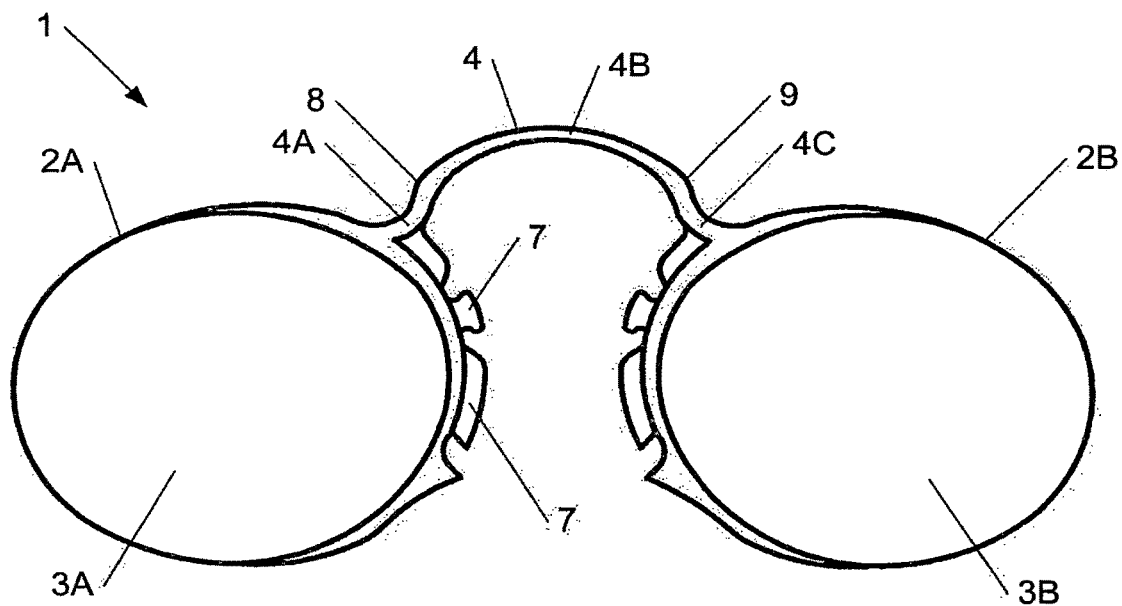
FIG. 3 illustrates an alternative embodiment of a pince-nez according to the invention.

FIG. 3 illustrates an alternative embodiment of the pince-nez 1 according to the invention, which has all of the elements described for the pince-nez 1 illustrated in FIG. 1, however with different connection means 7.

The pince-nez 1 illustrated is in a first ready-to-wear position, wherein the pince-nez 1 is arranged such that it can be placed on the nose of a user. In this first position of the pince-nez 1, the linkage 1 is in the resting position and the first and second points of inflection 8, 9 are spaced apart from each other.

In this embodiment, the connection means 7 are six in number and take on the shape of four fins and two buttons.

The fins 4 ease the guiding of the holding element 6 and limit the latter's forwards and backwards movement in relation to the pince-nez.

The buttons allow the holding element 6 to be engaged and held in position.

The structure of the pince-nez 1 is preferably made from polycarbonate 1 and the holding element 6 from silicone.

Figure 4:
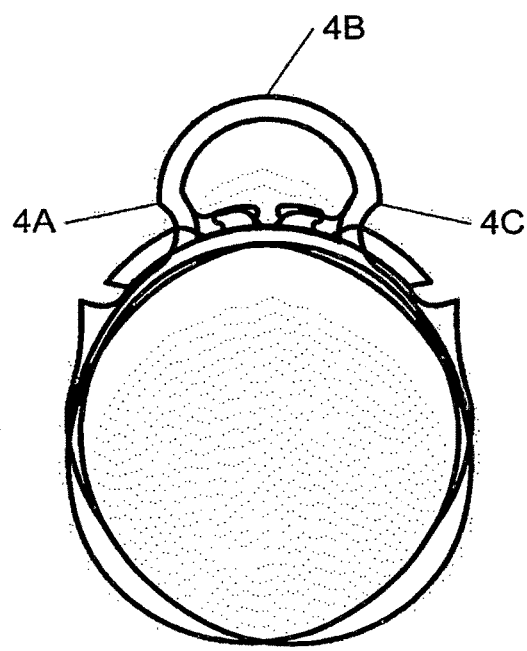
FIG. 4 is a diagrammatic view of the pince-nez illustrated in FIG. 3 when the linkage is in the tensioned position.

FIG. 4 illustrates one preferred embodiment of the pince-nez 1 in FIG. 3 when it is in a second position. As illustrated, the pince-nez 1 is in a position in which the first rim 2A covers at least partially the second rim 2B and in which the linkage 4 is in the tensioned position, whereby the first and second points of inflection 8, 9 are moved closer to each other.

More specifically, in this embodiment, the first rim 2A falls within a first plane and the second rim 2B falls within a second plane. The first and second planes are parallel to each other.

The linkage 4 of the pince-nez 4 in the tensioned position falls within a third plane, which is secant in relation to the first and second planes.

In this embodiment, the pince-nez 1 according to the invention can be stored in this position, for example in a pocket of a user, which is particularly advantageous.

Moreover, when the pince-nez 1 takes on the second position and the linkage 4 is in the tensioned position, the nasal separation between the first and second lenses 3A, 3B is found to be reduced. Therefore, the passage from the second position to the first position of the pince-nez 1 according to the invention allows for the nasal separation to be adjusted as desired.

The pince-nez 1 illustrated can also comprise a holding element 6 according to the invention and have the first and second positions.

The holding element 6 can be made from a material chosen from the group comprising elastomers, preferably polycarbonate, polyurethane, silicone, more preferably thermoplastic elastomers or combinations thereof.

The material of the holding element 6 has a modulus of elasticity such that it allows for the first and second points of inflection 6F, 6G to be moved closer to each other, when the pince-nez 1 adopts the second position, such that the linkage 4 of the pince-nez 1 is oriented in the tensioned position. In other words, the pince-nez 1 has a first ready-to-wear position, wherein the pince-nez 1 is arranged to be placed on the nose of the user, and a second position wherein the holding element 6 is deformed into its storage position.

Moreover and advantageously, the holding element 6 has a modulus of elasticity such that it contributes to holding the pince-nez 1 in the first position, whereby the linkage 4 is in the resting position.

Advantageously, the pince-nez 1 according to the invention has a first position in which the linkage 4 is in the resting position, whereby the first and second points of inflection 8, 9 are spaced apart from each other. The pince-nez 1 according to the invention also has a second position in which the linkage 4 is in the tensioned position, whereby the first and second points of inflection 8, 9 are moved closer to each other.

Figure 5:
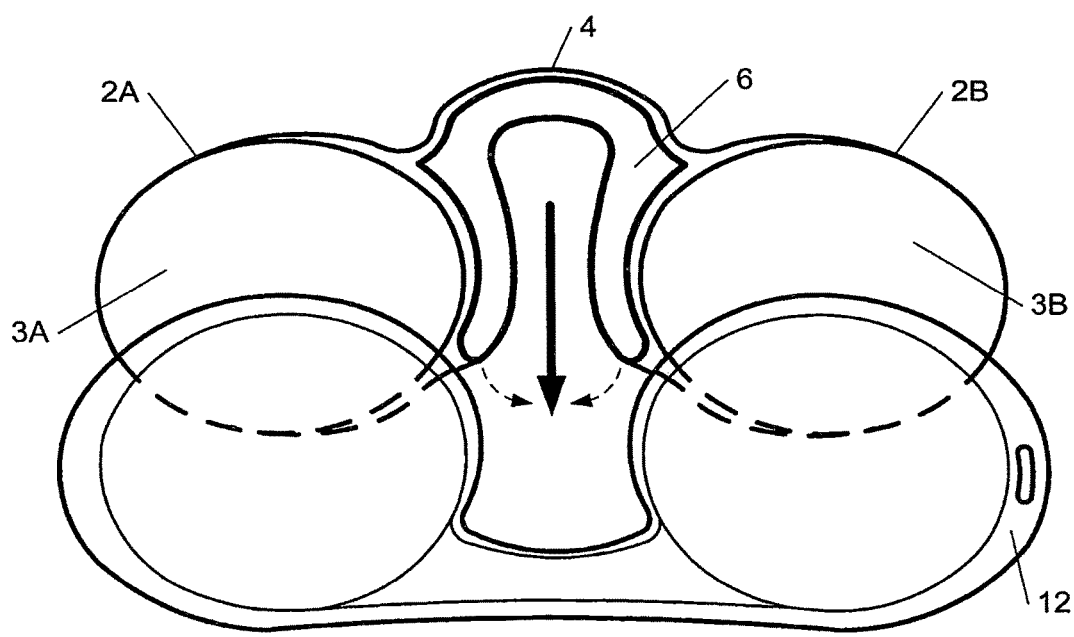
FIG. 5 shows a case according to this invention and a pince-nez provided with a holding element according to the invention.
Figure 6:
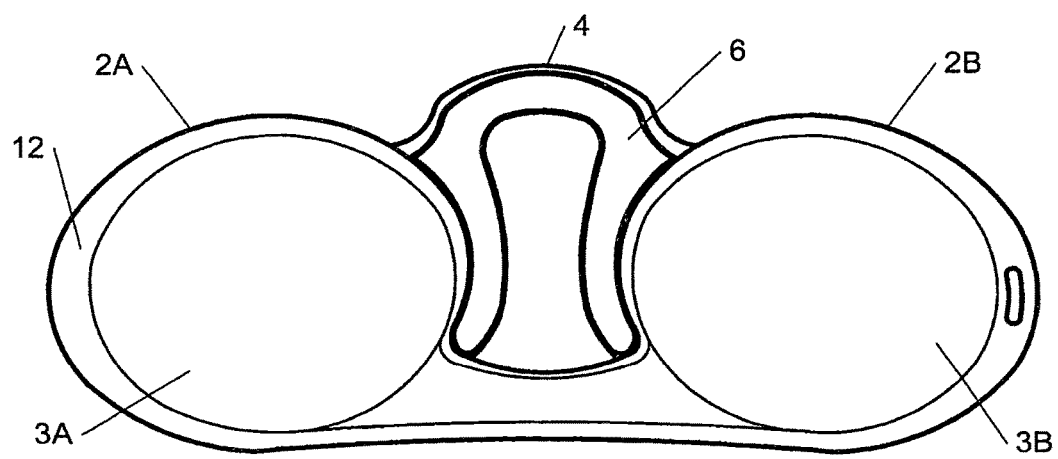
FIG. 6 shows the case illustrated in FIG. 5 when it contains the pince-nez with its holding element according to this invention.

FIGS. 5 and 6 illustrate the pince-nez 1 provided with the holding element 6 shown in FIG. 1 and a case 12 according to the invention.

The holding element 6 secured to the linkage 4 is elastically deformable between a storage position, whereby the portions 6A, 6C, 6D, 6E are separated from each other (FIGS. 5 and 6), and a tensioned position, wherein the portions 6A, 6C, 6D, 6E are constrained close together.

The case 12 comprises a location intended to store the holding element 6 while secured to the linkage 4. In particular, on FIGS. 5, 6, the case 12 comprises a first housing with a shape complementary to the shape of the first rim 2A provided with the first lens 3A, a second housing with a shape complementary to the shape of the second rim 2B provided with the second lens 3B, and a bridge connecting the first and second housings to each other, the location for the holding element 6 being delimited between the first and second housings and the bridge.

The pince-nez 1 and the location are designed so that, upon storing of the holding element 6 into said location, said holding element is reversibly deformed from its first to its second position for securing the holding element 6 in its first position into the location and thus the pince-nez 1 in the case 12.

As represented by the arrows on FIG. 5, the pince-nez 1 and the case 12 are arranged so that the storage of the pince-nez 1 in the case 12 is achieved upon relative translation between said pince-nez and said case. Moreover, the curved arrows show that the reversibly deformation of the holding element 6 in its second position is achieved by constrained rapprochement of lateral portions 6D, 6E of said holding element, said constrained rapprochement being initiated by bearing of said portions on walls of the housings that laterally delimit the location.

In particular, as shown on the figures, the lateral walls of the location and the lateral portions 6D, 6E of the holding element 6 comprise complementary concavities arranged to secure in the location the holding element 6 in its first position.

The length of the pince-nez 1 is defined as being the distance located between the ends the furthest away from the pince-nez in the first position, in the direction of the length of the pince-nez 1.

Preferably, the pince-nez has a length of between 8 and 11 cm, preferably 9 cm, more preferably 9.8 cm.

According to an embodiment, the case 16 has a length that is less than or equal to that of the pince-nez 1.

In this manner, the user looking to store the pince-nez 1 according to this invention can hold the pince-nez 1 in the first position at the level of the first and third portions 4A, 4C of the linkage 4 and then move the two points of inflection 8, 9 slightly towards each other to reduce the length of the pince-nez 1 and allow for its easy insertion into the case 16 according to the invention. Therefore, the pince-nez 1 takes on the second position in which the linkage 4 is slightly tensioned and the first and second points of inflection are substantially close to each other.

FIG. 6 illustrates the case 16 in FIG. 5, comprising the pince-nez in FIG. 5 with the holding element 6.

When the pince-nez 1 is housed in the case 16 according to this invention, its whole structure is housed in the case 16 except for the linkage 4 and the holding element 6, which remain visible.

In this manner, in order to remove the pince-nez 1 from the case 16, the user simply has to grasp the pince-nez 1 at the level of the linkage 4, preferably at the level of the first and third portions 4A, 4C of the linkage 4.

Figure 7:
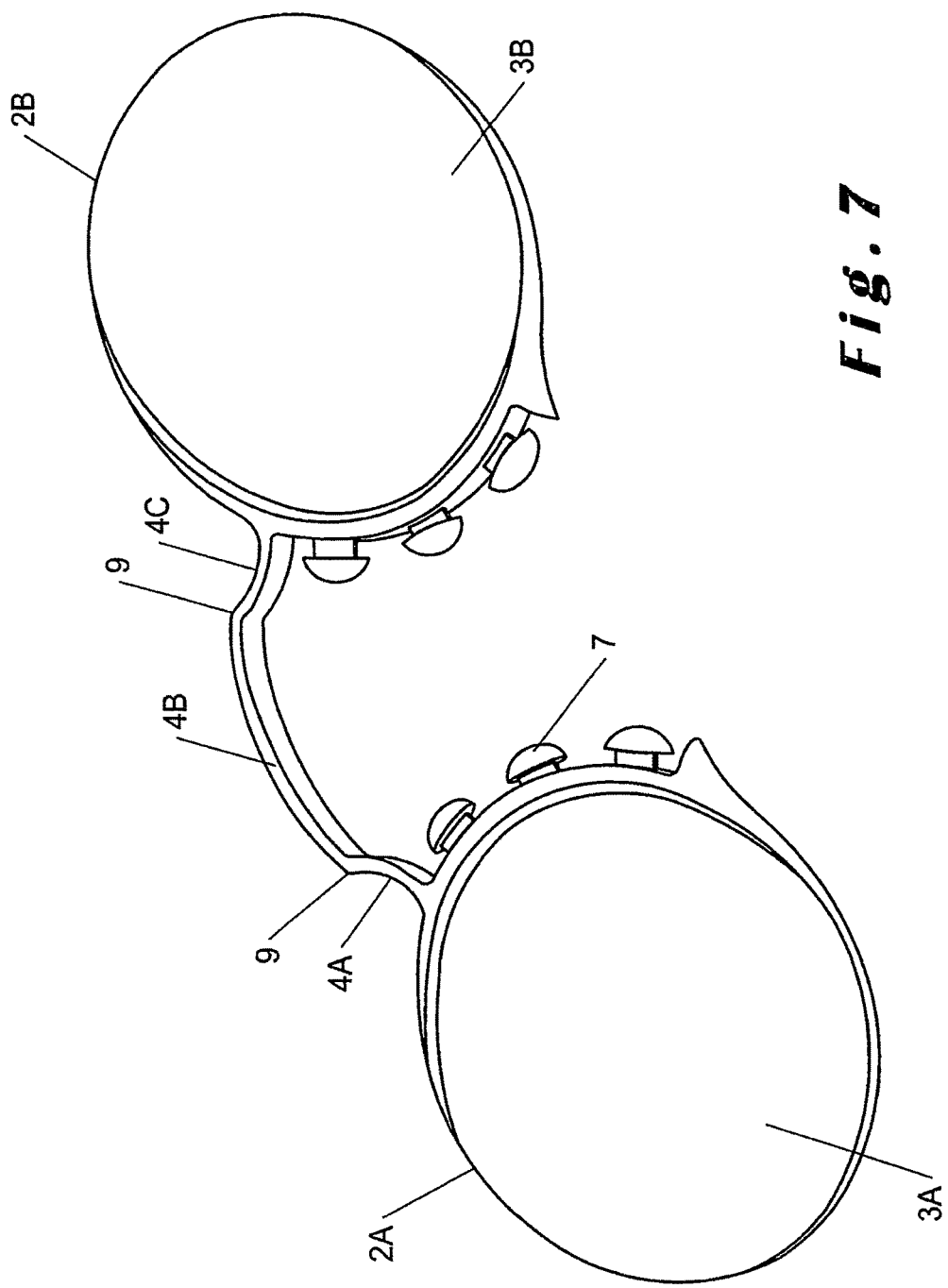
FIG. 7 shows a pince-nez according to one preferred embodiment of this invention.

FIG. 7 illustrates the pince-nez 1 illustrated in FIG. 3 and therefore comprises all elements described for this figure, except that the connection means 7 are present in the form of 6 buttons positioned on the first and second rims 2A, 2B.

It has been found that this embodiment allows the holding element 6 to be sufficiently maintained without limiting its backwards and forwards movement to a too great extent in relation to the pince-nez 1. This is advantageous for the user as the pince-nez 1 according to the invention has improved handling compared to the prior art.

The marketing of the pince-nez 1 according to the invention shall preferably consist in providing a pince-nez 1 and at least three holding elements 6 in different colours. In this manner, the user can choose the holding element he/she desires.

FIG. 8 illustrates the interior of a portion of the case 12 according to this invention.

The portion of the case illustrated allows the interior of the case 12 to be viewed. The inner portion of the case 12 has a first and second rim 13A, 13B in the shape of an arc of circle and a linking element 16 connecting said first and second rims 13A, 13B to each other, said first and second rims 13A, 13B being spaced apart from each other by a distance d corresponding to the length of the case (12) and being arranged so as to maintain said pince-nez (1) in the second position, when said pince-nez (1) is housed in said case (12).

The inner portion of the case 12 also has a plurality of protrusions 15 intended to be housed in cavities of another portion complementary to that illustrated in order to form the case 12 according to the invention.

Therefore, when the case 12 is used with the pince-nez 1 according to the invention, the pince-nez 1 is held in the second position in order to be inserted into the case 12. Then, once inserted in the case 12, the pince-nez 1 automatically takes on a position in which the first and second points of inflection substantially move away from each other, however preferably remain slightly tensioned at the level of the linkage 4.

Moreover, it has been found that the ends of the first and second lenses 3A, 3B are abutted against the thickness of the first and second rims 13A, 13B of the case 12 when the pince-nez 1 is housed in the case 12.

The case 12 according to the invention thus provides a space defined by the thickness of the first and second rims 13A, 13B of the case 12 according to the invention. This space is dedicated to the insertion of the pince-nez 1 according to the invention such that once inserted in the case 12 according to the invention, the pince-nez 1 is sufficiently held in this space, in particular thanks to its flexibility.

Furthermore, a case 16 according to the invention comprising the pince-nez 1 with the holding element 6 according to the invention can also be sold together or separately.

The pince-nez 1 according to the invention has the advantage of being able to be worn in one direction or in the other, without this affecting the dioptry of the lenses of the pince-nez 1 according to this invention.

This invention further relates to a method for manufacturing a pince-nez by one-shot injection of a polymer into a mould. The method comprises the following steps:
one-shot injection of a polymer into a mould having a pattern taking on the shape of two lenses connected to each other via a linkage to form a pince-nez, and
removal of said pince-nez from the mould.

Advantageously, this invention relates to a moulding method by one-shot injection to form the pince-nez 1 according to the invention, said method comprising the following steps:
one-shot injection of a polymer into a mould, the pattern of which has a first rim provided with a first lends and a second rim provided with a second lens, said first and second rims each being extended by a linkage that connects them to each other, said linkage being curved and having a first and second point of inflection to form a pince-nez (1),
removal of said pince-nez (1) from the mould.

Preferably, the one-shot injection step is performed by the injection of a polymer chosen from the group comprising elastomers, preferably polycarbonate and polyurethane.

It is understood that this invention is in no way limited to the embodiments described hereinabove and that modifications can be made without leaving the scope of the appended claims.

The invention claimed is:

1. An assembly comprising:
a pince-nez moulded in one piece and comprising a substantially planar structure which has a first rim provided with a first lens and a second rim provided with a second lens, said structure having a plane which passes through said first and second rims and said first and second lenses, said first and second rims each being extended by a linkage which connects said first and second rims together;
a holding element intended to be secured to the pince-nez in contact with the linkage and comprising at least two portions, said holding element secured to the linkage being elastically deformable between a storage position whereby the portions are separated from each other, and a tensioned position whereby the portions are constrained closer together; and
a case configured to contain said pince-nez for the storage of said pince-nez;
the case comprises a location intended to store the holding element while secured to the linkage, the pince-nez and the location being designed so that, upon storing the holding element into said location, said holding element is reversibly deformed from a first position to a second position for securing the holding element in a first position into the location and thus the pince-nez in the case;
wherein the deformation of the holding element into the second position is achieved upon constraint rapprochement of lateral portions of said holding element, said rapprochement being achieved by bearing of said lateral portions on walls of the location; and
wherein the walls of the location and the lateral portions comprise complementary concavities arranged to secure in the location the holding element in the first position.

2. The assembly according to claim 1, wherein the pince-nez and the case are arranged so that the storage of the pince-nez in the case is achieved upon relative translation between said pince-nez and said case, the reversibly deformation of the holding element being achieved by constrained rapprochement of lateral portions of said holding element.

3. The assembly according to claim 1, wherein the case comprises a first housing with a shape complementary to the shape of the first rim provided with the first lens, a second housing with a shape complementary to the shape of the second rim provided with the second lens, and a bridge connecting the first and second housings to each other, the location for the holding element being delimited between the first and second housings and the bridge.

4. The assembly according to claim 1, wherein the pince-nez has a first ready-to-wear position, wherein the pince-nez is arranged to be placed on the nose of a user, and a second position wherein the holding element is deformed into its storage position.

5. The assembly according to claim 4, wherein the case has a first rim and a second rim and a linking element connecting said first and second rims to each other, said first and second rims being spaced apart from each other by a distance d corresponding to the length of the case and being arranged so as to maintain said pince-nez in the second position, wherein said pince-nez is stored in said case.

6. The assembly according to claim 5, wherein the length of the case is less than or equal to that of the pince-nez in the first position such that, when the pince-nez in the first position takes on the second position, the pince-nez can be inserted into said case.

7. The assembly according to claim 1, wherein the structure of the pince-nez, the first lens and the second lens are made from a same material.

8. The assembly according to claim 1, wherein the first rim provided with the first lens partially surrounds said first lens and wherein the second rim provided with the second lens partially surrounds said second lens, said first and second rims having a thickness that is at least greater than that of said first and second lenses.

9. The assembly according to claim 1, wherein the linkage is curved and has a first and a second point of inflection.

10. The assembly according to claim 9, wherein the pince-nez has a first ready-to-wear position, wherein the pince-nez is arranged to be placed on a nose of a user, and wherein the linkage is in a resting position, whereby the first and second points of inflection are separated from each other, and a second position, wherein the linkage is in a tensioned position, whereby the first and second points of inflection are close together.

11. The assembly according to claim 9, wherein the linkage has a first linkage portion on one side of the first point of inflection, and a second linkage portion on the other side of the first point of inflection and said second linkage portion on one side of the second point of inflection, and a third linkage portion on the other side of the second point of inflection, the pince-nez having a first ready-to-wear position, wherein the pince-nez is arranged to be placed on a nose of a user, said first and third linkage portions having an upwards concavity when the pince-nez is in said ready-to-wear position.

12. The assembly according to claim 1, wherein the first and second lenses or the first and second rims are each provided with connection means arranged to secure the holding element to the pince-nez.

13. The assembly according to claim 1, wherein the holding element has a curved shape and comprises a first and a second point of inflection.

14. The assembly according to claim 13, wherein the holding element comprises a first portion on one side of the first point of inflection, and a second portion on the other side of the first point of inflection, and said second portion on one side of the second point of inflection, and a third portion on the other side of the second point of inflection, said first and third portions having an upwards concavity and said second portion having a downwards concavity.

15. The assembly according to claim 14, wherein the holding element comprises 5 curved portions, whereby the first, second and third portions are arranged so that they are in contact with respectively first, second and third portions of the linkage of the pince-nez and whereby the fourth and fifth portions are arranged such that they are secured to the pince-nez by means of connection means.

* * * * *